United States Patent Office 3,459,512
Patented Aug. 5, 1969

3,459,512
CENTRIFUGAL RECOVERY OF COPPER-VANADIUM CATALYST FROM ADIPIC ACID REACTION MIXTURE
James Massey Connolly and Christopher John Lowery, Manchester, England, assignors to Imperial Chemical Industries Limited, London, England, a corporation of Great Britain
No Drawing. Filed Jan. 17, 1966, Ser. No. 520,916
Claims priority, application Great Britain, Jan. 20, 1965, 2,547/65
Int. Cl. B01j 11/30
U.S. Cl. 23—293
4 Claims

ABSTRACT OF THE DISCLOSURE

A process for the recovery of metal catalyst comprising copper and vanadium compounds from the mother liquor obtained after separating adipic acid from the reaction mixture obtained by oxidizing with nitric acid starting materials containing cyclohexanol or cyclohexanone or their mixtures, which includes evaporating the mother liquor in the presence of sulphuric or phosphoric acid to remove water and nitric acid thereby leaving a molten residue, submitting the molten residue to centrifugal action and collecting the heavy fraction which separates as a result of the centrifugal action, the heavy fraction containing the copper and vanadium compounds and being recycled to the nitric acid oxidation step.

---

This invention relates to the recovery of metal catalysts from waste organic acids produced in the manufacture of adipic acid.

In the manufacture of adipic acid from cyclohexane it has already been proposed to oxidise the cyclohexane in stages, firstly with oxygen to form an initial oxidation product rich in cyclohexanol, and then to complete the oxidation of the cyclohexanol-rich initial oxidation product with nitric acid in presence of a metal catalyst comprising copper and vanadium. In similar manner adipic acid may be obtained by oxidation of other cyclohexanol or cyclohexanone-rich starting material with nitric acid in presence of the aforesaid catalyst.

It has already been proposed to recover the copper and vanadium catalysts from the waste liquors obtained in the manufacture of adipic acid by nitric acid oxidation of starting materials containing cyclohexanol and/or cyclohexanone by a process which comprises adding to the waste liquors sulphuric acid or phosphoric acid in an amount slightly more than equivalent to the nitrate salts present, evaporating the liquors until substantially all water and nitric acid has been removed and isolating the catalyst from the molten residue by filtration. However, isolation of the catalyst in this way has not been proved very efficient and loss of catalyst has often been substantial. The molten residue is so corrosive that cloth or glass fiber filters cannot be used, and metal mesh filters are not fine enough to retain the fine particles, so that much of the catalyst is lost into the filtrate. Surprisingly we have now found that more efficient recovery of the catalyst may be brought about by centrifuging the molten residue using a particular type of centrifuge.

According to the invention we provide a process for the recovery of metal catalysts comprising copper and vanadium compounds from the mother liquor obtained after separating adipic acid from the reaction mixture obtained by oxidising with nitric acid starting materials containing cyclohexanol and/or cyclohexanone, which process comprises evaporating the said mother liquor in presence of sulphuric acid or phosphoric acid to remove water and nitric acid, submitting the molten residue to centrifugal action, and collecting the heavy fraction which separates as a result of the centrifugal action.

The evaporation of the mother liquors containing the added sulphuric or phosphoric acid is preferably performed under reduced pressure. At about 100 mm. the evaporation may be performed rapidly and continued until a liquid temperature up to about 150° C. is reached. Vigorous reaction and decomposition may be prevented either by blowing steam (e.g. at a temperature of from 100° C. to 170° C) into the liquors or by continuously adding fresh or partially concentrated mother liquors, preferably at a temperature of from 40° C to 90° C, and adjusting the rate of addition of steam or fresh mother liquors so as to prevent undue rise in temperature, or the formation of nitrous gases above about 95° C. It may also be convenient to blow air through the hot molten residue after the evaporation in order to remove any remaining small amount of nitric acid. Owing to the presence of added mineral acid all the nitric acid, both free and that originally combined as salt, is removed and the acids/catalyst mixture can then be safely processed further.

Centrifuging of the molten residue may be conducted at temperatures up to 180° C. but it is preferred to work within the temperature range from 125° C. to 155° C.

In the process of the invention it is preferred to employ a centrifuge of the type having a bowl or rotor free from perforations and to withdraw the lighter fraction by allowing it to overflow from the bowl through orifices encircling the axis of rotation. The centrifuging can be performed continuously in a centrifuge having a cylindrical bowl with a solid wall rotatable about its main axis and an internally fitted screw conveyor rotatable about the same axis as the bowl and adapted for moving the heavier fraction from the region of the walls to a discharge point during the running of the centrifuge. Such centrifuges are conveniently designed to discharge heavy and high fractions from opposite ends. Suitable centrifuges of this kind are those supplied under the trade name Super-D Canter by Sharpless Centrifuges Limited of Camberley, England.

Preferably the heavy fraction containing vanadium and copper compounds which collects at the centrifuge wall is continuously removed during the centrifuging process. If allowed to solidify it forms a dark coloured powdery solid. This usually has the following analysis:

| | Percent |
|---|---|
| Copper | About 20 |
| Vanadium | 1.5–2 |
| Organic material | About 40 |
| Sulphate | About 2 |

This recovered material is suitable, without further treatment, for recycling as catalyst into adipic acid manufacture. Alternatively, if desired, copper and vanadium compounds can be recovered from it by chemical treatment.

Although the previous known recovery process proved in practice to be only about 50% efficient, the process of the present invention enables almost the whole of the copper and at least 80% of the vanadium to be recovered.

The invention is illustrated by the following example:

EXAMPLE

A molten residue containing oxidation products and vanadium and copper residues in the form of their salts, obtained by evaporating with sulphuric acid the nitric acid waste liquors produced in the manufacture of adipic acid as described above, was fed at the rate of 4,100 lbs. per hour to a Super-D Canter centrifuge provided with a solid walled horizontal cylindrical bowl and internal rotatable screw conveyor. The bowl speed was 4050 r.p.m. and the feed temperature was 160° C. Heavy fraction rich in catalyst was removed from the walls of the bowl by the screw conveyor. Light fraction over flowed from orifices nearer to the axis of rotation.

The catalyst contents of the original molten residue, the catalyst-rich heavy fraction separated therefrom, and the lighter fraction after removal of the catalyst-rich fraction were as follows:

|  | Catalyst content in percent by weight | |
| --- | --- | --- |
|  | Copper | Vanadium |
| Molten residue before centrifuging | 0.97 | 0.13 |
| Catalyst-rich heavy fraction | 19.05 | 1.70 |
| Light fraction after removal of catalyst-rich fraction | 0.016 | 0.021 |

The catalyst-rich heavy fraction was recycled into an oxidation plant manufacturing adipic acid and the catalyst contained in it was found to be still effective.

The molten residue used in this example was obtained by adding to the mother liquor sufficient sulphuric acid to give a total sulphate concentration equal to about twice the copper concentration and evaporating under a pressure of 100 mm. Steam at 170° C. was injected into the liquor during evaporation and evaporation was continued until the temperature of the liquid residue reached 150° C.

Phosphoric acid has also been used in place of sulphuric acid.

We claim:

1. In a process for the recovery of metal catalyst comprising copper and vanadium compounds from mother liquor remaining after separating adipic acid from a reaction mixture obtained by oxidizing a member selected from the group consisting of cyclohexanol, cyclohexanone and their mixtures with nitric acid by adding sulphuric or phosphoric acid to the mother liquor in an amount slightly more than equivalent to the nitrate salts present, evaporating the mother liquor until substantially all water and nitric acid have been removed thereby leaving a molten residue containing said catalyst, isolating the catalyst from the molten residue and recycling the isolated catalyst to the nitric acid oxidation step, the improvement comprising centrifuging said molten residue at a temperature of 125° to 180° C. to recover a catalyst-rich heavy fraction and recycling said catalyst-rich heavy fraction to said nitric acid oxidation step.

2. The process of claim 1 wherein said molten residue is centrifuged at a temperature of 125–155° C.

3. A process for the recovery of metal catalyst comprising copper and vanadium compounds from mother liquor remaining after separating adipic from a reaction mixture obtained by oxidizing a member selected from the group consisting of cyclohexanol, cyclohexanone and their mixtures with nitric acid, which process comprises adding sulphuric acid to the mother liquor in an amount to provide a total sulphate concentration equal to about twice the copper concentration, evaporating the resulting mixture by injecting steam at 170° C. into the mixture under a pressure of about 100 mm. Hg and continuing the evaporation until water and nitric acid are removed thereby leaving a molten residue containing said catalyst, centrifuging the molten residue at a temperature of 125° to 155° C. to recover a catalyst-rich heavy fraction and recycling said catalyst-rich heavy fraction to the nitric acid oxidation step.

4. The process of claim 3 wherein said molten residue is centrifuged at 155° C.

References Cited

UNITED STATES PATENTS

| 2,191,786 | 2/1940 | Aronon | 260—537 |
| 2,343,534 | 3/1944 | Cavanaugh et al. | 260—533 |
| 2,439,513 | 4/1948 | Hamblet et al. | 260—533 |
| 2,557,282 | 6/1951 | Hamblet et al. | 260—533 |
| 2,825,742 | 3/1958 | Schueler et al. | 260—586 |
| 2,863,501 | 12/1958 | Farnsworth | 159—24 |

FOREIGN PATENTS

| 572,260 | 9/1945 | Great Britain. |
| 976,919 | 12/1964 | Great Britain. |

NORMAN YUDKOFF, Primary Examiner

F. E. DRUMMOND, Assistant Examiner

U.S. Cl. X.R.

23—308; 203—35; 260—537